Jan. 22, 1935.   J. BIJUR   1,988,443
LUBRICATION
Filed Jan. 7, 1931   3 Sheets-Sheet 1

INVENTOR
Joseph Bijur
BY *Dean, Fairbank,*
*Hirsch & Foster*
his ATTORNEYS

Jan. 22, 1935.　　　　J. BIJUR　　　　1,988,443
LUBRICATION
Filed Jan. 7, 1931　　　3 Sheets-Sheet 2

INVENTOR
Joseph Bijur
BY
his ATTORNEYS

Jan. 22, 1935.   J. BIJUR   1,988,443
LUBRICATION
Filed Jan. 7, 1931   3 Sheets-Sheet 3
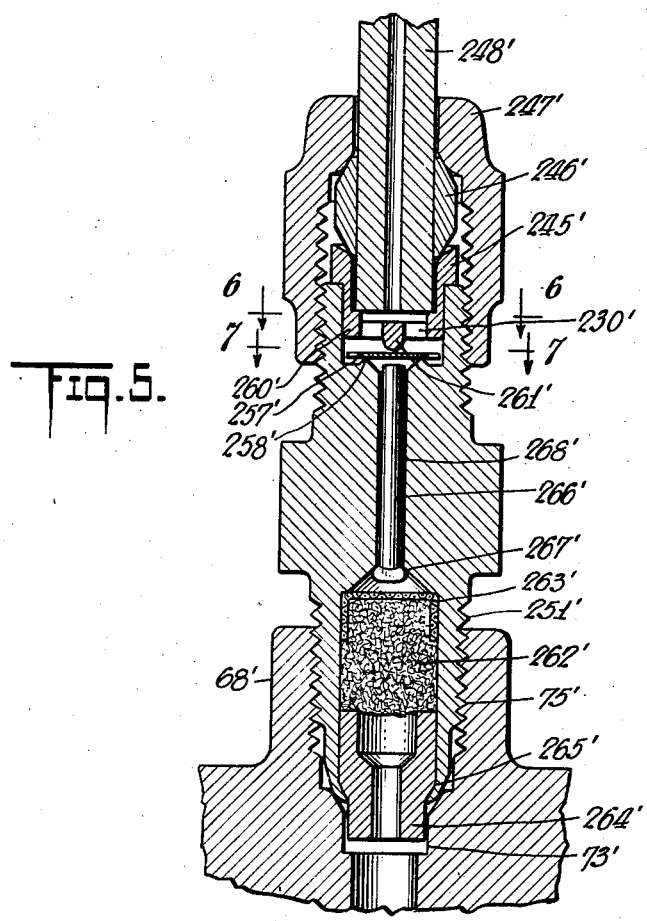
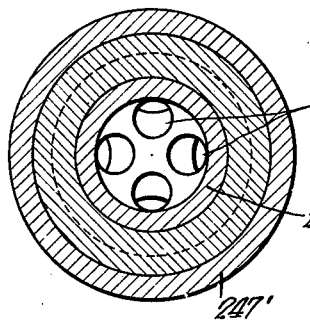
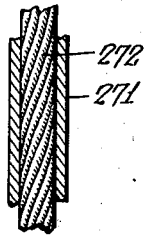
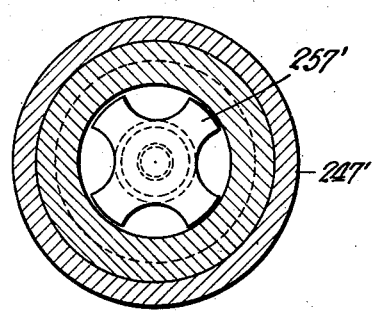
INVENTOR
*Joseph Bijur*
BY
Dean, Fairbank, Hirsch & Foster
his ATTORNEYS Patented Jan. 22, 1935

1,988,443

UNITED STATES PATENT OFFICE 1,988,443

LUBRICATION

Joseph Bijur, New York, N. Y., assignor to Auto Research Corporation, a corporation of Delaware Application January 7, 1931, Serial No. 507,128

35 Claims. (Cl. 184—7)

This invention relates to lubrication, and is concerned more especially with central lubricating systems particularly adapted to automobiles and other vehicles.

Among the objects of the invention are to furnish a central automobile chassis lubricating system, which will proportion lubricant satisfactorily despite wide variations between summer and winter operation in the viscosity of the lubricant in the chassis lines, and which will accomplish this result even though some particular bearing or bearings be maintained throughout the seasons at elevated temperatures varying far less widely than the temperature of the other chassis bearings, and/or even though some particular bearing or bearings be at level materially higher than others.

Another object is to provide a simple flow controlling or drip plug construction of specialized utility for feeding the particular bearings above set forth from the same centralized system which feeds the remaining bearings, through drip plugs of the general type of construction shown in my prior Patent No. 1,632,772.

The specialized flow controlling or drip plug construction is not limited in its usefulness to the particular relations above set forth, but it may also be used to advantage in feeding oil to bearings where the supply conduit in part or whole is arranged to accommodate substantial relative movement, as by the utilization of a flexible relatively expandible conduit, or where the bearing is so located that a drip plug directly applied thereat would be relatively inaccessible for inspection or replacement or where a conduit leading thereto or a drip plug applied thereat would be too freely exposed to mechanical injury.

Other objects are in part obvious and in part pointed out hereinafter.

Among the features of the invention are positioning the flow metering or drip plug devices that feed the particular bearings enumerated, at a substantial distance from said bearings, preferably substantially within the range of levels of the majority of the drip plugs which feed the remaining chassis bearings, and at such distance from the hot engine or other parts at elevated temperature that they are not substantially heated thereby and in fact are maintained at substantially the same temperature as the other drip plugs.

Inasmuch as the drip plugs of the particular bearings enumerated are thus not applied directly at the bearings as usual, but on the contrary are affixed upon frame structure and feed to their associated bearings from tail pipes, these drip plugs may have a specialized structure for such application adapting them to be attached to and to feed from junction fittings.

In the accompanying drawings in which there are shown one or more of the various possible embodiments of the features of this invention:

Figs. 5, 6 and 7 show a somewhat different form of flow metering device; Fig. 5 being a longitudinal section and Figs. 6 and 7 being transverse sectional views upon the lines 6—6 and 7—7 of Fig. 6; and Fig. 8 is a fragmentary longitudinal sectional view showing a modified tail pipe construction.

Figure 1:
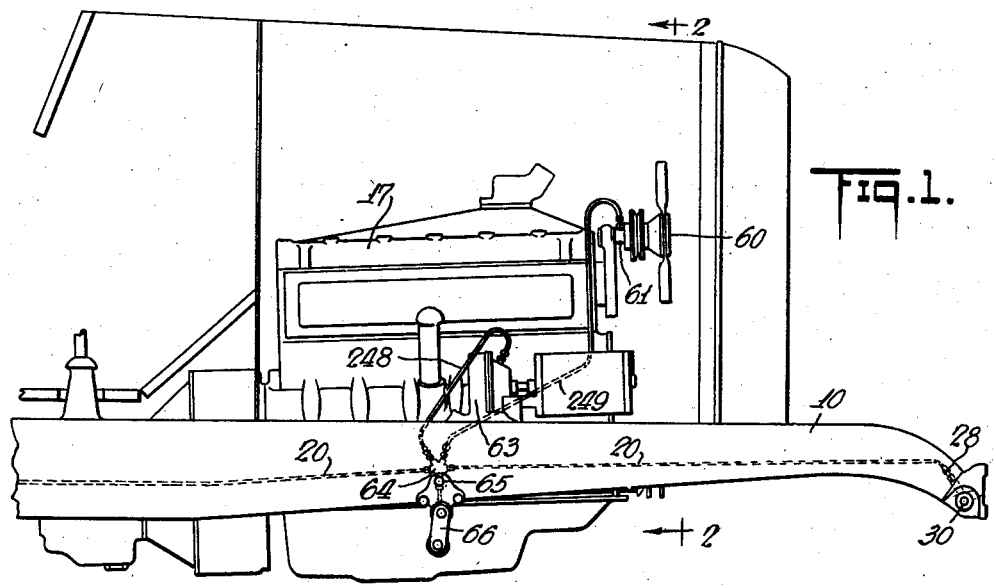
Fig. 1 is a side view of an automobile engine with the hood removed and of part of the chassis supporting the same, showing the lubricant connections of the present invention.
Figure 2:
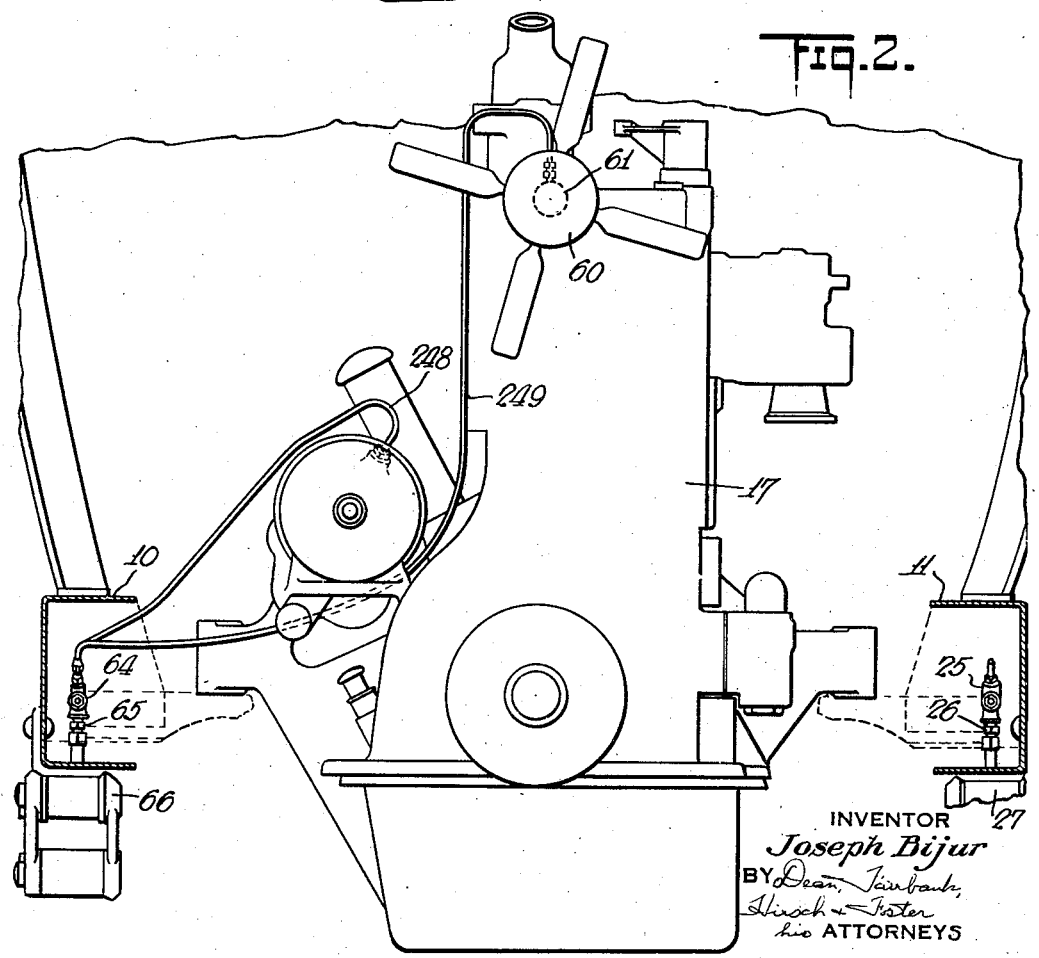
Fig. 2 is a fragmentary front view on a larger scale in transverse section along the line 2—2 of Fig. 1.
Figure 4:
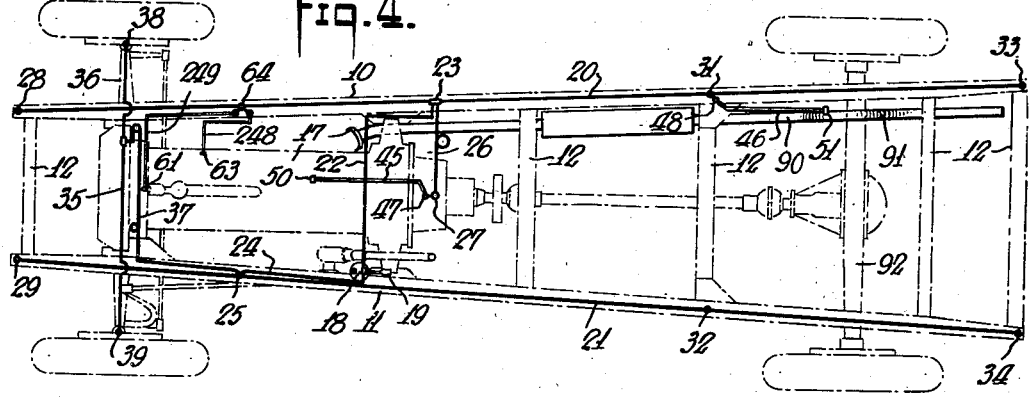
Fig. 4 is a diagrammatic plan of a typical chassis lubricating layout.

Figs. 1, 2 and 4 show an automobile chassis composed of the side frame members 10 and 11 which are connected by the transverse members 12 upon which chassis is supported the motor 17. The lubricant reservoir pump unit 18 (see particularly Fig. 4) which supplies the central chassis lubricating system, is illustratively shown provided with a foot pedal 19, but, if desired, may be automatically actuated intermittently or continuously. The lubricating mains 20 and 21 extend the full length of the chassis frames inside of the U-shaped side members 10 and 11 and they are adapted to receive the supply of lubricant from the reservoir 18 by means of the transverse lines 22 and 24 which lead to junctions 23 and 25 on the mains 20 and 21, respectively. The junction 23 is connected by a branch line 26 to a flow metering device or drip plug 27 which supplies the clutch release and the junction 25 (see Fig. 2) is also provided with a flow metering device or drip plug 26 which supplies a spring shackle 27. The mains 20 and 21 also supply the front spring hinges by the flow metering devices or drip plugs 28 and 29, the rear spring hinges by the flow metering devices or drip plugs 31 and 32 and the rear spring shackles by means of the drip plugs 33 and 34. There is a subsidiary transverse main 35 along the front axle 36 which is supplied with lubricant by the branch connection 37 from the junction 25, said subsidiary main leading to the drip plugs 38 and 39 supplying the steering knuckles. These flow metering devices or drip plugs, for example the drip plug 28 in Figs. 1 and 26 in Fig. 2, are placed closely adjacent to the bearings which they lubricate so as to make the length of gravity feed as short as possible, and may be of the same general construction as the junction drip plugs subsequently described, shown in Patents Nos. 1,632,772 and 1,746,139.

Associated with the engine structure is the fan 60 with a bearing 61 and the water pump 63 with a bearing not shown. These bearings are lubricated from a junction 64 (see Figs. 1 to 4) upon the main 20, which junction is attached to the chassis frame by means of the drip plug or flow metering device 65 supplying the spring shackle 66. The junction is provided with five bosses 67, 68, 69, 70 and 71, which last mentioned one is enlarged and thereby reinforced, and is tapped, socketed and capped thereby upon the pipe threaded end 65' of drip plug 65. Each of the bosses has a bore 72, said bores meeting at the center of the junction fittings which are similarly enlarged in the case of bosses 67 to 70 adjacent the ends thereof to form tapped sockets 75 and 80, pipe abutting shoulders 73 and 74 and conical clamping depressions 79 and 81, the sockets 80 receiving the special drip plugs to be described. Sections of the main 20 are coupled to the junction 64 by means of the bushings 76 and coupling sleeves 77 inserted in the sockets 75.

Into the sockets 80 of the bosses 68 and 69 are adapted to be inserted one or more drip plugs or flow metering devices consisting of bodies 250 having machine threaded nipples 251 at one end screwed into the sockets 80 and pipe terminal sockets 254 at the other end to which the tail pipes 248 and 249 may be attached by clamping the coupling sleeves 246 between the thimbles 247 and the bushings 245, the bushings 245 being inserted into the outer portions of said sockets 254 and the thimbles 247 being screwed upon the threaded nipple portions 255 of the body 250. The inner part of the socket 254 is formed into an annularly ridged valve seat 258 upon which is adapted to seat the valve disk 257, said valve disk being pressed against said seat by means of the spring 244 which is retained within the socket by the retainer 243. In the socket at the threaded end 251 of the drip plug is positioned a strainer consisting of a felt wad 262 backed by a wire mesh cup 263, said strainers being kept in position by the hollow end plug 264, lodged snugly in the strainer socket and engaging the end of the felt plug 262 at the periphery thereof and, if desired, extending beyond the socket to seat against the shoulder 74. The metering effect is obtained by means of the calibrated restriction pin 266 being disposed in the longitudinal bore 268, said pin being retained in position between the valve 257 and the mesh 263, and the rating of the metering device or drip plug being determined by the length and/or diameter of said pin.

Figure 3:
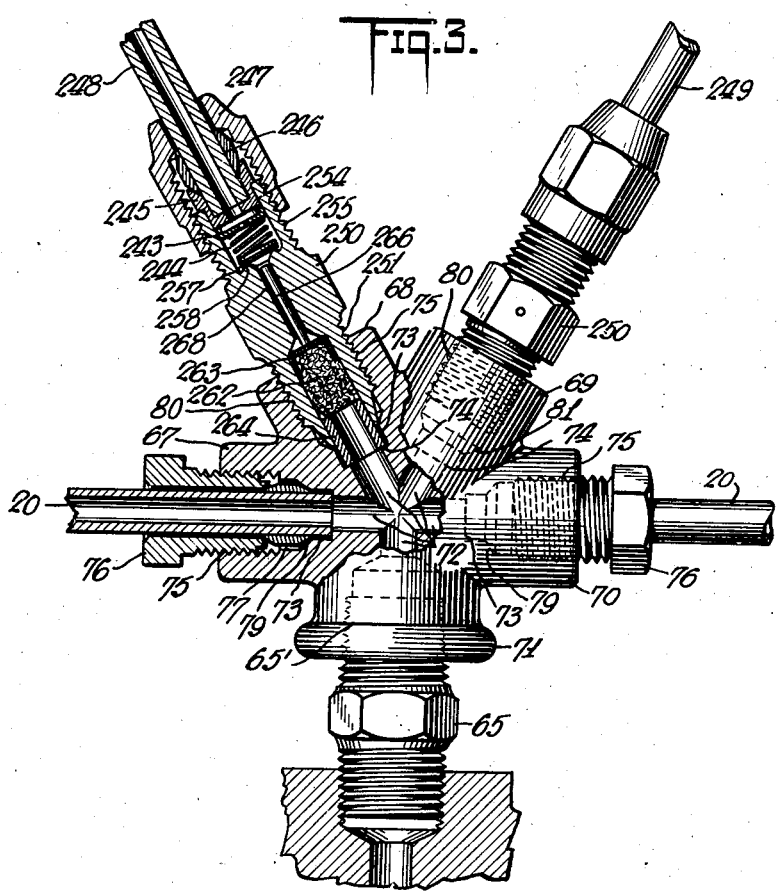
Fig. 3 is a view partly in longitudinal section of one embodiment of the flow metering device.

Inasmuch as the drip plug 250 is attached to a junction at its inlet end instead of to a bearing element at its outlet end as is quite customary, it may be termed a junction or reverse flow drip plug.

Where the invention is applied to a system continuously delivering oil to the bearings throughout all or most of the period of vehicle operation, the valves of drip plugs 250 may be devoid of the seating springs 244, and the construction of said reverse or junction drip plug may be substantially as shown in Figs. 5 to 7 (similarly functioning parts being designated by the same numerals as in Fig. 3 primed). In this embodiment the sleeve or end plug 264' is shouldered and is held in place by rolling the edge 265' of the drip plug thereover. The pin 266' is headed at 267 to prevent it from sliding outwardly and possibly opening the loose, flap valve 257'. The check valve 257' (see Fig. 7) preferably consists of a scalloped disk of light, flexible oil-resistant material, such as oil-silk, which is adapted to cooperate during emission with the open spider construction 260' at the inner end of the steel thimble or bushing 245'. The spider construction (see Fig. 6) consists of a number of symmetrically positioned outlet openings 230' and a central projection or protrusion 261' which limits the deflection of the valve 257' from its seat 258'.

In practice, the pipe lines are all completely filled with lubricant before the vehicle leaves the factory. When the pipes 248, 249 and 248' of Figs. 3 and 5 are subsequently supplied with lubricant upon the application of lubricant pressure from a central source, there will be forced out of the top or outlet end of the tail pipe into said bearings an equivalent amount of lubricant as is forced past valves 257 into the lower ends of the pipes. The drip plugs 250 will be maintained substantially at chassis frame temperature and will proportion the lubricant correctly in regard to the rest of the drip plugs, even though the temperature of the hot bearings to which they supply lubricant may remain more nearly constant than that of the chassis bearings which varies widely between the ranges of summer and winter temperatures.

In addition, the drip plugs supplying the elevated auxiliary engine bearings will be within the level range of the remaining chassis bearings. As an illustrative example, the range of level of drip plugs in one embodiment was approximately three inches with a bearing range of about twenty-four inches.

In operation of the drip plug of Figs. 5 to 7, any tendency of the distributing system to leak through one or more of the lower outlets thereof would result in the light valve 257' being drawn to its seat 261' by the tension exerted by said incipient leak upon the oil in the connecting passageways. The valve 257' is submerged in oil by the substantial length or column of lubricant thereabove, thereby providing not only an oil seal but a substantial head of oil resting upon and tending to seat the valve. In the embodiment of Fig. 3 the valve 257 would be positively seated under spring pressure as soon as the pressure from the central source is relieved. Substantially, all of the lubricant within the length of the riser pipe would have to be drawn past the valve, by the suction engendered in an incipient leak, before air could enter and as this is practically precluded, leakage is inhibited.

The tail conduits 248 and 249 to the elevated bearings preferably have very fine bores, thereby to reduce the volume of each pipe to the utmost. In one embodiment pipes of about 1.5 millimeters or 0.06 inches bore diameter with an effective volume of 0.54 cc. per foot of length equal to about ten drops of preferred chassis lubricant at room temperature, have been satisfactorily employed, as compared to the normal bore of the chassis piping between drip plugs of about ⅛ inch to $\tfrac{3}{16}$ inch.

The small bore of pipes 248, 249 and 248' may afford considerable resistance to flow in view of the substantial length, and it may be desirable to compensate the flow retarding effect thereof by the selection of a drip plug restriction of appropriate rating. Also due to the small bores of the riser or tail pipe 248, 249 and 248', the lubricant will be retained by capillarity even though the pipes are directed downwardly instead of upwardly as shown in Figs. 1 and 2.

Instead of a pipe of small diameter, as shown in Figs. 4 and 5, equivalent small volume tail pipes may be attained by utilizing riser pipes 271 (see Fig. 8) of larger diameter, filled with a snugly fitting core 272 of twisted strands of wire or cord, the effective volume being then determined by the interstices between the wire filler and the pipe bore.

Should the riser or tail pipes 248, 249 and 248' of Figs. 3 and 5 become injured or have to be replaced in vehicle use, such empty pipes, by reason of their very small volumes, will promptly refill with lubricant. Such lubricant would then reach the bearing, following drip plug discharge, after but a short period of vehicle use. Even though one or more of the tail pipes 248 and 249 should become broken, the chassis lubrication will not be deranged as the drip plugs in junction 64 will preclude the formation of unrestricted outlets otherwise occurring were the corresponding drip plugs located at the bearings on the engine.

In Fig. 4 are diagrammatically shown two other tail pipe arrangements, the tail pipe 45 leading from a drip plug 47 fixed in the junction, which may carry a drip plug 27 supplying the clutch bearing, and the tail pipe 46 similarly leading from a drip plug 48 attached to the junction carrying the drip plug 31. The junction 27—47 is supplied from the main 20 and is mounted in a relatively cool position upon the clutch housing and supplies a bearing 50 mounted in a relatively hot position adjacent the engine. The tail pipe 46 supplies a bearing 51 which may be on one of the arms or links of a rear shock absorber, positioned close to the upward bend 91 in the rearwardly extending hot exhaust pipe 90 where it is elevated to pass over the rear axle 92. This construction eliminates the need of utilizing a pressure conduit to supply the rear shock absorbers which would not be very well protected and therefore liable to breakage and obviates the necessity of positioning drip plugs thereat which would be liable to be damaged and would be relatively inaccessible for inspection and replacement.

The present application is a continuation in part of my prior application Serial No. 285,526 filed June 15, 1928.

By the expression "reversed drip plug" as used in the accompanying claims is meant a drip plug which has its inlet end held in lubricant-tight fashion in a junction or mounting element and its outlet end connected to a branch pipe feeding a bearing substantially removed from the drip plug. This contrasts with the usual drip plug, the outlet end of which is threaded into a socket in the fixed bearing element and the inlet end of which is attached to a feed pipe.

While it is preferred to use the specific drip plug construction described for the majority of the bearings, it is within the scope of my invention as defined in the broader claims to employ in locations removed from the bearings to be lubricated, drip plugs of the type adapted to be applied directly at the bearings they are to lubricate, such for instance as disclosed in my Patent No. 1,632,772.

By the expression "auxiliary engine bearings" is meant those bearings associated with, and/or supported upon, the engine structure, which are not ordinarily lubricated from the central system supplying the engine bearings. The additional bearings, which are usually not positioned directly upon the chassis, but which in some cases may be so positioned, may be one or more in number, and may have all three of the characteristics of differing from the remaining bearings in level in temperature and in relative movability.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In a central lubricating system for automobiles adapted to lubricate chassis and engine bearings, in combination, a branched conduit system supported upon the chassis frame leading to the chassis bearings and to an engine bearing and flow metering devices upon said conduit system adapted to proportion and divide the lubricant flowing to the various bearings, the flow metering device suplying the engine bearing being positioned closely adjacent to the chassis frame and substantially removed from said bearings.

2. In a central lubricating system for automobiles adapted to lubricate chassis and engine bearings, in combination, a branched conduit system supported upon the chassis frame leading to the chassis bearings and to an engine bearing and flow metering devices upon said conduit system adapted to proportion and divide the lubricant flowing to the various bearings, the flow metering device supplying the engine bearing being positioned in, but remote from the outlet of, the branch leading to the engine bearing.

3. In a central lubricating system for supplying lubricant to the chassis and engine bearings of an automobile, in combination, a conduit system supported upon the chassis frame, branches leading from said conduit system to the chassis and engine bearings, junction fittings upon the chassis frame forming connections between the conduit system and the branches and flow metering devices associated with the conduit system and its branches to proportion and divide the lubricant between the various bearings, the flow metering device in the case of the engine bearing being placed in a junction upon the chassis frame and being connected to the engine bearing by a tail pipe extending from said junction to said bearing.

4. In an automobile provided with an engine supported upon a chassis, a lubricating installation for a bearing upon said engine comprising a conduit system positioned upon the chassis, a branch leading from said conduit system to a bearing on said engine and a flow metering restriction device positioned upon the chassis at the place of junction of said branch and said conduit system.

5. In an automobile provided with an engine supported upon a chassis and a clutch housing attached to said engine, a lubricating installation for a bearing upon said engine comprising a conduit system positioned upon the chassis, a junction upon the clutch housing, a branch leading from said conduit system to said junction, another branch leading from said junction to said bearing communicating with said first mentioned conduit through said junction and a flow metering instrumentality positioned upon said second mentioned branch at said junction.

6. In an automobile provided with an engine supported upon a chassis, a rearwardly extending hot exhaust connection, a rear axle and a shock absorber connected between said chassis and said rear axle and adjacent said exhaust connection; a lubricating installation for the bearings of said shock absorber comprising a conduit system positioned upon the chassis, a junction upon said conduit system also positioned upon the chassis adjacent said shock absorber, a flow metering instrumentality connected to said junction and a conduit of substantial length extending from said flow metering instrumentality to said bearings.

7. A junction construction for a central lubricating system supported upon a bearing structure, comprising a junction fitting, an inlet pipe terminal secured to said fitting, a flow metering device directly connected to said fitting and supporting the same from said bearing element and another flow metering device directly connected to said fitting adapted to receive lubricant in parallel with the first mentioned flow metering device and a pipe terminal connected to said second mentioned flow metering device leading to another bearing.

8. In combination with a central lubricating system, a combined junction and flow metering device supported upon a bearing supplying said bearing and another bearing, comprising a multi-socketed junction, an inlet pipe terminal attached in one of said sockets, a flow metering device attached to another of said sockets and to an element of the first mentioned bearing, a second flow metering device attached in another socket and a pipe terminal leading to another bearing attached to said second mentioned device.

9. A combined junction and flow metering device for a central lubricating system adapted to be supported upon a bearing structure and to meter the lubricant to said bearing structure and to one or more other bearing structures, said device comprising a junction fitting with a plurality of centrally intersecting and outwardly extending bores, the outer portions of which are enlarged to form tapped sockets, and longitudinal flow metering devices, the ends of which are threaded into said sockets, one of said flow metering devices serving to support the combined device upon said bearing structure and the free end or ends of the other device or devices being connected to said other bearing structure or structures by appropriate tail pipe constructions.

10. A combined junction and flow metering device comprising a junction fitting provided with a tapped socket at the bottom of which is a tapered depression and a longitudinal flow metering drip plug fitting stem the end of which is threaded into said socket and which is provided with a non-deformable tapered nose beyond said threaded portion wedged against said tapered depression to form a liquid-tight connection.

11. A combined junction and flow metering device comprising a junction fitting provided with a shouldered and tapped socket and a longitudinal flow metering drip plug fitting stem, the inlet end of which is threaded into said socket and which is provided at said end with a socket containing a strainer plug and with a sleeve annularly clamping said filter plug and telescoped within said socket and extending beyond said stem to be abutted by said shoulder.

12. A drip plug comprising a fitting having a nipple adapted for application to a support and an outlet adapted for connection thereto of a delivery pipe, a strainer in the nipple end of said fitting and a restriction protected thereby.

13. A drip plug comprising a fitting having a nipple adapted for application to a support and an outlet adapted for connection thereto of a delivery pipe, a strainer in the nipple end of said fitting, and a check valve protected thereby.

14. A drip plug comprising a fitting having a nipple adapted for application to a support and an outlet adapted for connection thereto of a delivery pipe, a check valve and a restriction in said fitting and a strainer in the nipple end of said fitting.

15. A drip plug comprising a fitting having a pipe thread end at its outlet for application to a mounting structure and a cylindrical thread for connection thereto of a delivery pipe end, a strainer in a corresponding socket at the mounting end of the fitting, a check valve in a corresponding socket at the delivery pipe end of the fitting, and restriction means in said fitting interposed between said strainer and said valve.

16. A drip plug comprising a fitting having an end adapted for application to a support structure, a strainer in a corresponding socket in said end, a hollow end plug in the outer end of said socket and having a reduced extension over which the extremity of said socket is rolled, a valve seat conformation within a socket in the opposite end of said fitting, a hard terminal sleeve lodged within said socket and having a spider conformation at its inner end, said sleeve also serving as a compression terminal for a feed pipe extremity, a floating check valve interposed between said valve seat and said spider, and a loose metal restriction pin in a corresponding longitudinal bore between the strainer and the spider construction, said pin having an enlargement at the strainer end thereof to prevent sliding thereof into engagement with the floating check valve.

17. A drip plug device comprising a longitudinal body with a central passageway and with inlet and outlet sockets, the ends of which body are externally threaded around said sockets, a pin restriction in the central passageway, a strainer and a valve in the inner portions of the inlet and outlet sockets respectively, coupling thimbles in the outer portions of the inlet and outlet sockets, a pipe end associated with the coupling thimble in the outlet socket and a coupling nut threaded upon the outlet end of the body cooperating with said outlet thimble to couple said pipe end to said body in a liquid tight fashion.

18. In a liquid distribution system, a flow controlling fitting comprising a body having a socket in the end thereof, a valve in the inner portion of said socket, a coupling thimble in the outer portion of said socket, a coupling nut embracing the socketed end of said body, and a pipe end connected to said body by coupling cooperation between said nut and said thimble, the base of said thimble and the bottom of said socket being so formed that the valve is adapted to reciprocate therebetween and to cooperate therewith alternately to stop and permit flow of fluid therethrough.

19. In a liquid distribution system, a flow controlling fitting comprising a body having a socket in the end thereof, a valve in the inner portion of said socket, a coupling thimble in the outer portion of said socket, a coupling nut embracing the socketed end of said body, and a pipe end connected to said body by coupling cooperation between said nut and said thimble, the base of said thimble and the bottom of said socket being so formed that the valve is adapted to reciprocate therebetween and to cooperate therewith alternately to stop and permit flow of fluid therethrough, the base of the thimble being formed with a series of spaced openings and with a projection, whereby it serves as a valve retainer permitting fluid flow, while the bottom of the socket is formed as a valve seat to cooperate with the valve to prevent fluid flow.

20. A central lubricating installation for a mechanism involving a multiplicity of spaced bearings at nearly the same level, said mechanism having at least one additional bearing differing from said multiplicity in being at a substantially different level when the mechanism is positioned in its normal level position; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearing disposed substantially at the level of said multiplicity of bearings and tail pipe conduit means conveying the output of said last mentioned instrumentalities to the corresponding additional bearing.

21. A central lubricating installation for a mechanism involving a multiplicity of spaced bearings substantially fixed relatively to each other, said mechanism having at least one additional bearing differing from said multiplicity in being relatively movable in respect to said multiplicity of bearings; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearing disposed substantially immovable relative to the multiplicity of bearings and tail pipe conduit means conveying the output of said last mentioned instrumentalities to the corresponding additional bearing.

22. A central lubricating installation for a mechanism involving a multiplicity of spaced bearings maintained at nearly the same temperature, said mechanism having at least one additional bearing differing from said multiplicity in being maintained at a substantially different normal temperature; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings, and closely adjacent to said bearings, flow metering instrumentalities for said additional bearings disposed at a position where it will be within the range of temperatures of said multiplicity of bearings and tail pipe conduit means conveying the output of said last mentioned instrumentalities to the corresponding additional bearing.

23. A central lubricating installation for a mechanism involving a multiplicity of spaced bearings at nearly the same level, said mechanism having at least one additional bearing differing from said multiplicity in being at a substantially different level when the mechanism is positioned in its normal level position; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearings disposed substantially at the level of said multiplicity of bearings and tail pipe conduit means conveying the output of said last mentioned instrumentalities to the corresponding additional bearing, the first mentioned bearings being chassis bearings and the second mentioned bearing being an auxiliary engine bearing.

24. A central lubricating installation for a mechanism involving a multiplicity of spaced bearings at nearly the same level, said mechanism having at least one additional bearing differing from said multiplicity in being at a substantially different level when the mechanism is positioned in its normal level position; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearing disposed substantially at the level of said multiplicity of bearings and tail pipe conduit means conveying the output of said last mentioned instrumentalities to the corresponding additional bearing, the first mentioned bearings being positioned substantially below the second mentioned bearing.

25. A central lubricating installation for a mechanism involving a multiplicity of spaced bearings at nearly the same level, said mechanism having at least one additional bearing differing from said multiplicity in being at a substantially different level when the mechanism is positioned in its normal level position; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearing disposed substantially at the level of said multiplicity of bearings and tail pipe conduit means conveying the output of said last mentioned instrumentalities to the corresponding additional bearing, the first mentioned bearings being positioned substantially below the second mentioned bearing and the conduit means being valved to prevent drainage thereof.

26. A central lubricating installation for a mechanism involving a multiplicity of spaced bearings at nearly the same level, said mechanism having at least one additional bearing differing from said multiplicity in being at a substantially different level when the mechanism is positioned in its normal level position; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearing disposed substantially at the level of said multiplicity of bearings and tail pipe conduit means conveying the output of s 'd last mentioned instrumentalities to the corresponding additional bearing, the first mentioned bearings being positioned substantially below the second mentioned bearing and the flow controlling instrumentality in said conduit means being valved to prevent drainage of the conduit into the system.

27. A central lubricating installation for a mechanism involving a multiplicity of spaced bearings at nearly the same level, said mechanism having at least one additional bearing differing from said multiplicity in being at a substantially different level when the mechanism is positioned in its normal level position; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearing disposed substantially at the level of said multiplicity of bearings and tail pipe conduit means conveying the output of said last mentioned instrumentalities to the corresponding additional bearing, the conduit means being of small bore so as to retain its contents due to capillarity.

28. A central lubricating installation for a mechanism involving a multiplicity of spaced bearings at nearly the same level, said mechanism having at least one additional bearing differing from said multiplicity in being at a substantially different level when the mechanism is positioned in its normal level position; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearing disposed substantially at the level of said multiplicity of bearings and tail pipe conduit means conveying the output of said last mentioned instrumentalities to the corresponding additional bearing, the conduit means being of materially smaller bore than the distributing system.

29. A central lubricating installation for a mechanism involving a multiplicity of spaced bearings at nearly the same level, said mechanism having at least one additional bearing differing from said multiplicity in being at a substantially different level when the mechanism is positioned in its normal level position; said installation comprising a branched distribution system leading and supplying lubricant by means of branches to all of said bearings and having a single inlet into which lubricant may be injected under pressure, a central pump connected to said inlet, flow metering instrumentalities at the outlets of the branches to each of said multiplicity of bearings and closely adjacent to said bearings, flow metering instrumentalities for said additional bearing disposed substantially at the level of said multiplicity of bearings and tail pipe conduit means conveying the output of said last mentioned instrumentalities to the corresponding additional bearing, the conduit means being substantially filled for all or a major part of its length by a readily permeable material.

30. A drip plug including a unitary fitting having a restriction therein, an unthreaded pipe terminal sleeve telescoped into a corresponding socket at an end of the fitting, said sleeve having a valve retainer construction at its inner end, a valve seat integrally formed in said fitting adjacent said retainer construction at the bottom of said socket and a light disk valve interposed between said seat and said construction, the end of the fitting holding the pipe terminal sleeve being threaded and adapted to receive a compression coupling nut and a pipe end, said pipe end being compressed against the sleeve when the pipe end is coupled to the fitting.

31. A drip plug including a unitary fitting having a restriction therein, an unthreaded pipe terminal sleeve telescoped into a corresponding socket at an end of the fitting, said sleeve having a valve retainer construction at its inner end, a valve seat integrally formed in said fitting adjacent said construction at the bottom of said socket and a light floating disk valve interposed between said seat and said valve retainer construction, said construction having a central protrusion extending toward the valve and limiting the displacement thereof, the end of the fitting holding the pipe terminal sleeve being threaded and adapted to receive a compression coupling nut and a pipe end, said pipe end being compressed against the sleeve when the pipe end is coupled to the fitting.

32. A drip plug comprising a unitary fitting having a threaded nipple at one end thereof containing a socket and adapted to be applied to a supporting structure, a strainer in the socket in said nipple, an unthreaded terminal sleeve in the outer end of said socket rigidly connected to said socket, said sleeve enabling a lubricant-tight abutment against the bottom shoulder of a tapped socket receiving said nipple, a valve seat conformation within a socket in the opposite end of said fitting, a second unthreaded terminal sleeve lodged within said second socket and having a valve retainer conformation at its inner end, said sleeve also serving as a compression coupling abutment terminal for a feed pipe extremity, a check valve interposed between said valve seat and said conformation, and a flow restriction filler in a corresponding bore between said strainer and said valve.

33. A central lubricating installation for a plurality of bearings of a mechanism having a single metallic supporting structure carrying bearings and maintained at one temperature, and another structure having a temperature substantially different from that of said carrying structure and carrying at least one additional bearing, comprising a branched distribution system leading to said bearings and flow metering instrumentalities upon said system for proportioning the lubricant supplied to said bearings, said instrumentalities being directly supported upon, and in heat transferring relationship with the single metallic structure so that they will all be maintained at the temperature thereof, the instrumentality feeding said additional bearing on said second structure being provided with and connected to said bearing by an elongated tail pipe extending from said single metallic structure to said second structure.

34. A central lubricating installation for a plurality of bearings of a mechanism having a single metallic supporting structure carrying bearings, and another structure having a temperature substantially different from that of said carrying structure and carrying at least one additional bearing, comprising a branched distribution system having a main conduit with branches, each including a flow metering instrumentality feeding said bearings, the flow metering instrumentality metering the lubricant supplied to said additional bearing being positioned in the system adjacent the point of connection of the main conduit and the branch, and substantially removed from said bearing and the flow metering instrumentalities metering the lubricant supplied to the remaining bearings being positioned on the system at the outlets of the branches thereof to said other bearings.

35. A pipe coupling arrangement comprising a longitudinal body provided with a pipe threaded end portion for attachment to a supporting structure, with a machine threaded end for attachment to a conduit end, with sockets at the inlet and outlet ends, the bottom of the latter socket being formed into an annular valve seat and with a central passageway between said sockets, a restriction pin substantially filling said passageway, a check valve enclosed in said outlet socket and cooperating with said seat, a strainer enclosed in the inner portion of the inlet socket and a reinforcing sleeve enclosed in the outer portion of said inlet socket holding said strainer in position and projecting therebeyond to cooperate with the supporting structure, and a compression coupling attached to said conduit end of said body and a conduit end attached by said coupling to said end of said body.

JOSEPH BIJUR.